(No Model.)

H. B. FOX.
Celluloid and other Imitation Collars, Cuffs, and Fronts.

No. 234,665. Patented Nov. 23, 1880.

Witnesses:
W. W. Dodge.
Wm. H. Hadaway

Inventor:
H. B. Fox
By Dodge & Son
Attys

UNITED STATES PATENT OFFICE.

HOWARD B. FOX, OF LIVERPOOL, ENGLAND, ASSIGNOR OF ONE-HALF TO WILLIAM PHILLIPS THOMPSON, OF SAME PLACE.

CELLULOID AND OTHER IMITATION COLLAR, CUFF, AND FRONT.

SPECIFICATION forming part of Letters Patent No. 234,665, dated November 23, 1880.

Application filed September 21, 1880. (No model.)

*To all whom it may concern:*

Be it known that I, HOWARD BUSBY FOX, of Liverpool, in the county of Lancaster and Kingdom of England, have invented certain new and useful Improvements in Celluloid and other Imitation Linen Collars, Cuffs, and Fronts made from Water-Proof Materials; and I do hereby declare that the following is a full, clear, and exact description of the invention, which will enable others skilled in the art to which it appertains to make and use the same.

Celluloid and other collars, cuffs, and fronts of water-proof material, hereinafter spoken of under the generic name "celluloid," have this one fatal objection—that, being water-proof, they are hot and unhealthy.

Now, my invention consists in perforating those parts which are hidden from sight with a series of perforations, preferably as close as can be without unduly weakening the strength of the material. Thus in collars the band is perforated; in cuffs, the part hidden by the sleeve, leaving the outer inch or so unperforated; in fronts, that part is perforated which is hidden by the waistcoat, but useful for keeping the front in place. By this means much larger fronts and longer cuffs can be worn with no more inconvenience than the small-dimensioned ones now sold. The outside rim for about an eighth of an inch should not be perforated, as perforations near the edge have a tendency to cause tears.

My invention further consists in perforating the shirt-fronts, and even in some cases the collars or cuffs, by stamping them out and embossing them in a press so as to resemble embroidery with holes embroidered round; also, in stamping the imitation stitches so as to form entire perforations at intervals, thereby increasing the ventilation.

Figure 1:
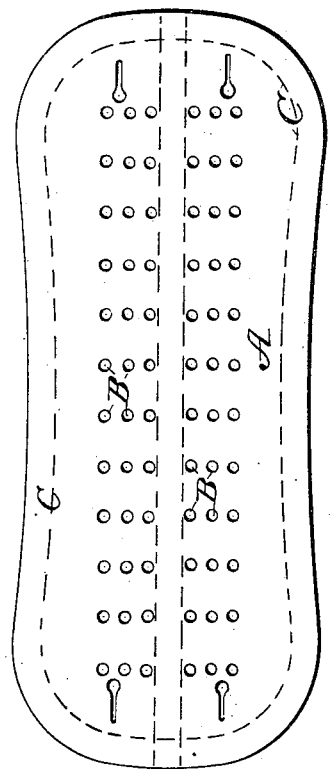
Figure 2:
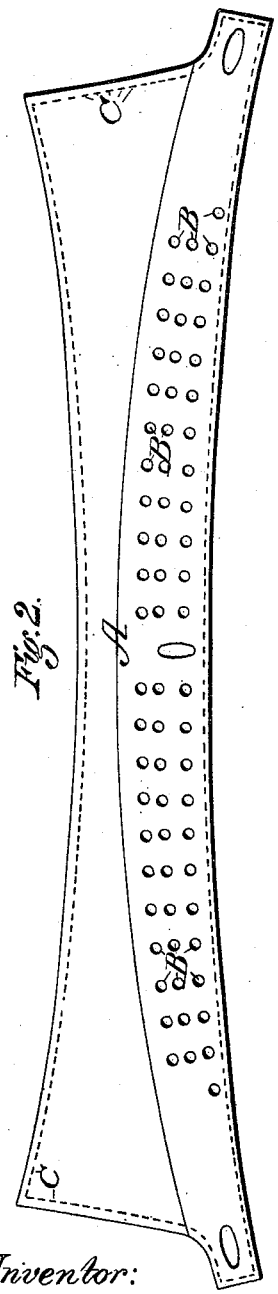

In the accompanying drawings, Figure 1 represents a cuff, and Fig. 2 a collar, embodying my improvements.

A in both figures represents the body of the article, B the perforations, and C the perforated indentations made in imitation of stitching.

I claim as my invention—

1. As a new article of manufacture, a celluloid collar, cuff, or shirt-front with the parts hidden from sight perforated, so as to secure ventilation.

2. As a new article of manufacture, a celluloid collar, cuff, or shirt-front with perforations and depressions or elevations to resemble stitches or ornamental embroidery on the part that can be seen, for the purposes of ventilation.

3. The combination of a cuff or collar of unperforated celluloid or other white water-proof material used for making such articles, and a band of attachment perforated nearly all over with perforations for the purposes of ventilation.

HOWARD BUSBY FOX.

Witnesses:
W. P. THOMPSON,
CHARLES SOUTHALL.